(12) United States Patent
Labrecque et al.

(10) Patent No.: US 10,221,764 B2
(45) Date of Patent: Mar. 5, 2019

(54) VARIABLE GEOMETRY INLET SYSTEM

(71) Applicant: PRATT & WHITNEY CANADA CORP., Longueuil (CA)

(72) Inventors: Michel Labrecque, St-Bruno (CA); Vincent Couture-Gagnon, Boucherville (CA); Richard Ullyott, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 722 days.

(21) Appl. No.: 14/462,981

(22) Filed: Aug. 19, 2014

(65) Prior Publication Data

US 2016/0053683 A1 Feb. 25, 2016

(51) Int. Cl.
| | | |
|---|---|---|
| *F02C 7/045* | (2006.01) | |
| *F02K 3/04* | (2006.01) | |
| *F02C 7/042* | (2006.01) | |
| *F01D 17/14* | (2006.01) | |
| *F02K 3/02* | (2006.01) | |

(52) U.S. Cl.
CPC ............ *F02C 7/045* (2013.01); *F01D 17/143* (2013.01); *F02C 7/042* (2013.01); *F02K 3/025* (2013.01); *F02K 3/04* (2013.01); *F05D 2250/311* (2013.01); *F05D 2250/712* (2013.01); *F05D 2250/90* (2013.01); *F05D 2260/96* (2013.01)

(58) Field of Classification Search
CPC .......... F02C 7/042; F02C 7/045; F02K 3/025; F02K 3/04; F05D 2260/96
See application file for complete search history.

(56) References Cited

U.S. PATENT DOCUMENTS

| | | | |
|---|---|---|---|
| 2,752,111 A | 6/1956 | Schairer | |
| 3,421,296 A | 1/1969 | Beurer | |
| 3,532,129 A | 10/1970 | Ward et al. | |
| 3,533,486 A | 10/1970 | Paulson | |
| 3,611,724 A | 10/1971 | Kutney | |
| 3,618,700 A | 11/1971 | Bond | |
| 3,623,494 A * | 11/1971 | Poucher | F02C 7/042 |
| | | | 137/15.2 |
| 3,820,626 A | 6/1974 | Bonneaud et al. | |
| 3,998,048 A | 12/1976 | Derue | |
| 4,047,911 A | 9/1977 | Krojer | |

(Continued)

FOREIGN PATENT DOCUMENTS

| | | |
|---|---|---|
| EP | 2199204 A2 | 6/2010 |
| FR | 2906569 A1 | 4/2008 |

(Continued)

OTHER PUBLICATIONS

Extended European Search Report dated Jan. 14, 2016 issued on Applicant's corresponding European Patent Application No. 15181537.0-1607.

(Continued)

*Primary Examiner* — Carlos A Rivera

(74) *Attorney, Agent, or Firm* — Norton Rose Fulbright Canada LLP

(57) ABSTRACT

A variable geometry inlet system of an aircraft engine includes an inlet duct. The inlet duct includes at least first and second sections moveable between extended and retracted positions such that the inlet duct defines a variable axial length of an inlet in controlling noise.

20 Claims, 5 Drawing Sheets

(56) References Cited

U.S. PATENT DOCUMENTS

| | | | |
|---|---|---|---|
| 4,075,833 A | 2/1978 | Sargisson | |
| 4,132,240 A | 1/1979 | Frantz | |
| 4,155,221 A | 5/1979 | Dhoore et al. | |
| 4,192,336 A | 3/1980 | Farquhar et al. | |
| 4,250,703 A | 2/1981 | Norris et al. | |
| 4,346,860 A | 8/1982 | Tedstone | |
| 4,463,772 A | 8/1984 | Ball | |
| 4,534,167 A * | 8/1985 | Chee | B64D 29/06 181/214 |
| 4,881,367 A | 11/1989 | Flatman | |
| 5,000,399 A * | 3/1991 | Readnour | B64D 33/02 244/130 |
| 5,014,933 A | 5/1991 | Harm et al. | |
| 5,315,820 A * | 5/1994 | Arnold | B29C 70/08 428/116 |
| 5,702,231 A * | 12/1997 | Dougherty | B64D 33/02 181/212 |
| 5,782,082 A | 7/1998 | Hogeboom et al. | |
| 6,089,505 A | 7/2000 | Gruensfelder et al. | |
| 6,609,592 B2 | 8/2003 | Wilson | |
| 6,896,099 B2 * | 5/2005 | Porte | B64D 33/02 181/210 |
| 7,048,229 B2 | 5/2006 | Sanders et al. | |
| 7,429,018 B1 | 9/2008 | Kechely | |
| 7,588,212 B2 * | 9/2009 | Moe | B64D 15/12 244/134 D |
| 7,857,257 B2 | 12/2010 | Schwarz | |
| 7,938,224 B2 | 5/2011 | Frustie et al. | |
| 8,181,905 B2 | 5/2012 | McDonough et al. | |
| 8,529,188 B2 | 9/2013 | Winter | |
| 8,579,076 B2 | 11/2013 | Ayle et al. | |
| 2011/0000548 A1 | 1/2011 | Sanders et al. | |

FOREIGN PATENT DOCUMENTS

| | | |
|---|---|---|
| GB | 761235 A | 11/1956 |
| GB | 850691 | 10/1960 |
| GB | 2266340 A | 10/1993 |

OTHER PUBLICATIONS

Extended European Search Report dated Jan. 14, 2016 issued on Applicant's corresponding European Patent Application No. 15181596.6-1607.

Extended European Search Report dated Jan. 14, 2016 issued on Applicant's corresponding European Patent Application No. 15181618.8-1607.

Extended European Search Report dated Jan. 14, 2016 issued on Applicant's corresponding European Patent Application No. 15181594.1-1607.

* cited by examiner

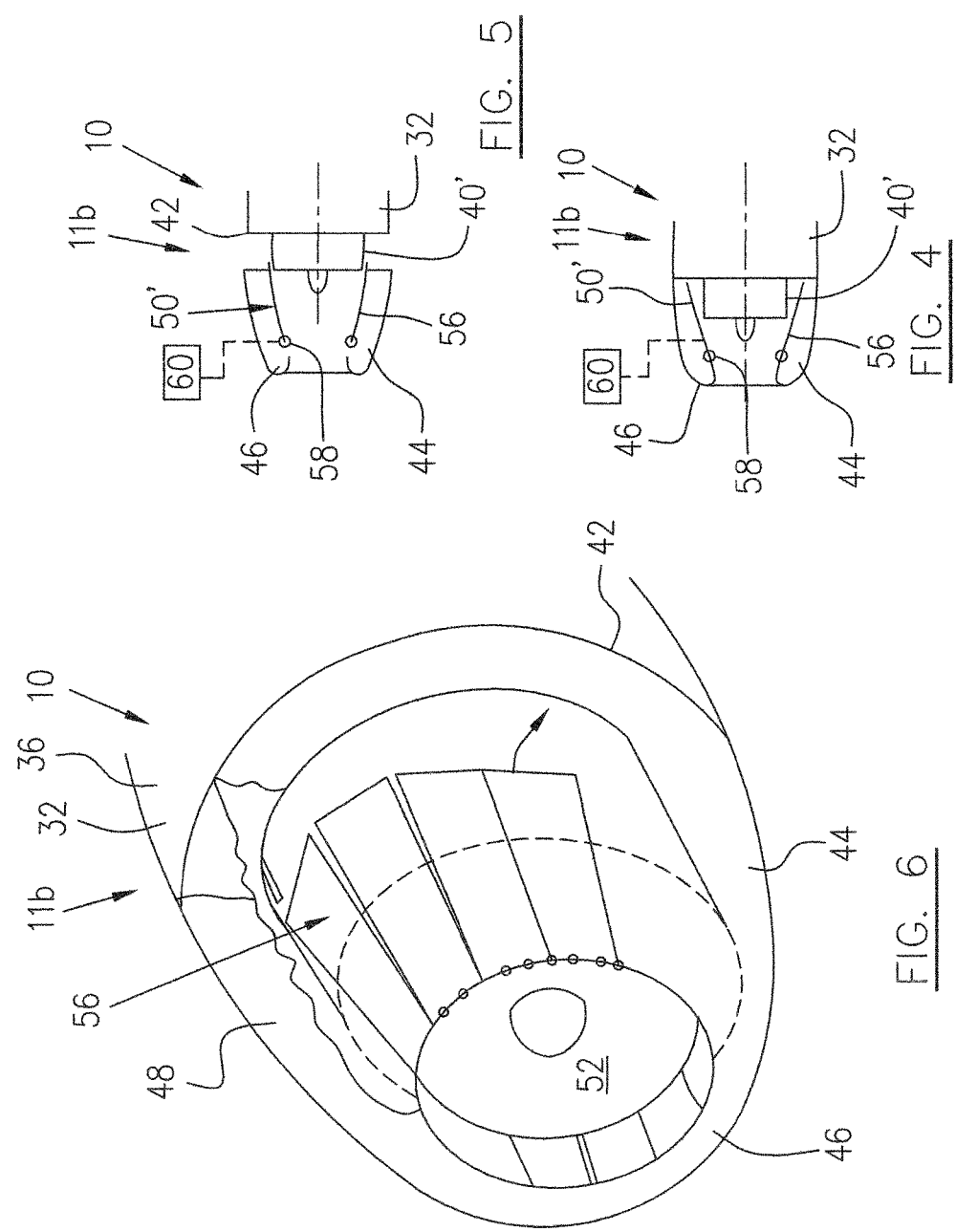

VARIABLE GEOMETRY INLET SYSTEM

TECHNICAL FIELD

The described subject matter relates generally to aeroengines, and more particularly to aircraft engines inlet systems.

BACKGROUND OF THE ART

It is well understood that significant sources of noise generated by aircraft gas turbine engines are the result of viscous wake and rotor turbulence interaction. Such generated noise may propagate forwardly to thereby result in community noise particularly when the aircraft approaches an airport for landing. One of the conventional approaches toward suppressing noise generated in this manner, is to line the inlet with sound-absorbing panelling. However, because of the close proximity of the fan or compressor to the inlet frontal plane, and the lack of acoustic shielding in the forward direction, a significant portion of the noise may still propagate forward out of the inlet duct.

Accordingly, there is a need to provide an improved engine inlet system for aircraft gas turbine engines.

SUMMARY

In one aspect, there is provided a variable geometry inlet system of an aeroengine comprising an inlet duct for directing an air flow from an opening in the inlet duct to a compressor, the inlet duct including at least first and second sections, the first and the second sections movable relative to one another between an extended position and a retracted position, the first and second sections in the extended position defining an axially longer inlet duct than when in the retracted position, the inlet duct extending continuously from the opening to the compressor in both positions and providing only one inlet path for the air flow from the opening to the compressor regardless of the inlet duct position.

In another aspect, there is provided a turbofan aeroengine comprising a fan and compressor section, a combustion section, a turbine section and a nacelle surrounding at least the fan and compressor section, the nacelle including a main portion in a stationary relationship with the engine, the main portion having an annular outer skin and an inner barrel radially spaced apart from each other, the nacelle including an inlet cowl having a lip portion connected with an annular outer skin and an annular inner wall radially spaced apart from each other, the inlet cowl being disposed upstream of the main portion with respect to an air flow entering the nacelle through a front opening defined by the lip portion of the inlet cowl, the inlet cowl being operatively connected to the main portion and translatable between a retracted position in which the outer skins of the respective inlet cowl and main portion of the nacelle are immediately axially adjacent or overlap each other and in which the annular inner wall of the inlet cowl and the inner barrel of the main portion are inserted one into the other, and an extended position in which the outer skins of the respective inlet cowl and main portion of the nacelle are positioned axially spaced apart from or overlap each other and in which the annular inner wall of the inlet cowl and the inner barrel of the main portion are inserted one into the other less than the insertion in the retracted position, the annular inner wall of the inlet cowl and the inner barrel of the main portion thereby forming a length-variable inlet duct for directing the air flow toward the fan and compressor section.

In a further aspect, there is provided a turbofan aeroengine comprising a fan and compressor section, a combustion section, a turbine section and a nacelle surrounding at least the fan and compressor section, the nacelle including a main portion in a stationary relationship with the engine, the main portion having an annular outer skin and an inner barrel radially spaced apart from each other, the nacelle including an inlet cowl disposed upstream of the main portion with respect to an air flow entering the nacelle through a front opening defined by an annular lip portion of the inlet cowl, the lip portion being affixed to an annular outer skin of the inlet cowl, and a plurality of circumferentially distributed plates being pivotally connected about a tangentially pivoting axis at a respective front edge thereof to the lip portion to form an annular inner wall radially spaced apart from the outer skin of the inlet cowl, the annular inner wall being in an variable truncated conical profile having a fixed diameter at the front edge of the respective plates and a variable diameter at a rear edge of the respective plates, the rear edge of the respective plates being opposite to the front edge of the respective plates, the inlet cowl being operatively connected to the main portion and being axially translatable between a retracted position in which the outer skins of the respective inlet cowl and main portion of the nacelle are immediately axially adjacent each other with the inner barrel of the main portion being partially inserted into the inner wall of the inlet cowl, and an extended position in which the outer skins of the respective inlet cowl and the main portion of the nacelle are positioned axially spaced apart from each other with the inner barrel of the main portion being partially inserted into the inner wall of the inlet cowl less than the insertion in the retracted position, the annular inner wall of the inlet cowl and the inner barrel of the main portion thereby forming a length-variable inlet duct for directing the air flow.

Further details of these and other aspects of the described subject matter will be apparent from the detailed description and drawings included below.

DESCRIPTION OF THE DRAWINGS

Reference is now made to the accompanying figures in which:

FIG. 4 is a schematic partial cross-sectional view of a turbofan aeroengine having a variable geometry inlet system in a retracted position according to another embodiment;

FIG. 5 is a schematic partial cross-sectional view of the turbofan aeroengine of FIG. 4 showing the variable geometry inlet system in an extended position;

FIG. 6 is a schematic partial perspective view of the turbofan aeroengine having the variable geometry inlet system of FIG. 4 in such a retracted position, with a portion of an outer skin of an inlet cowl cutaway.

DETAILED DESCRIPTION

Figure 1:
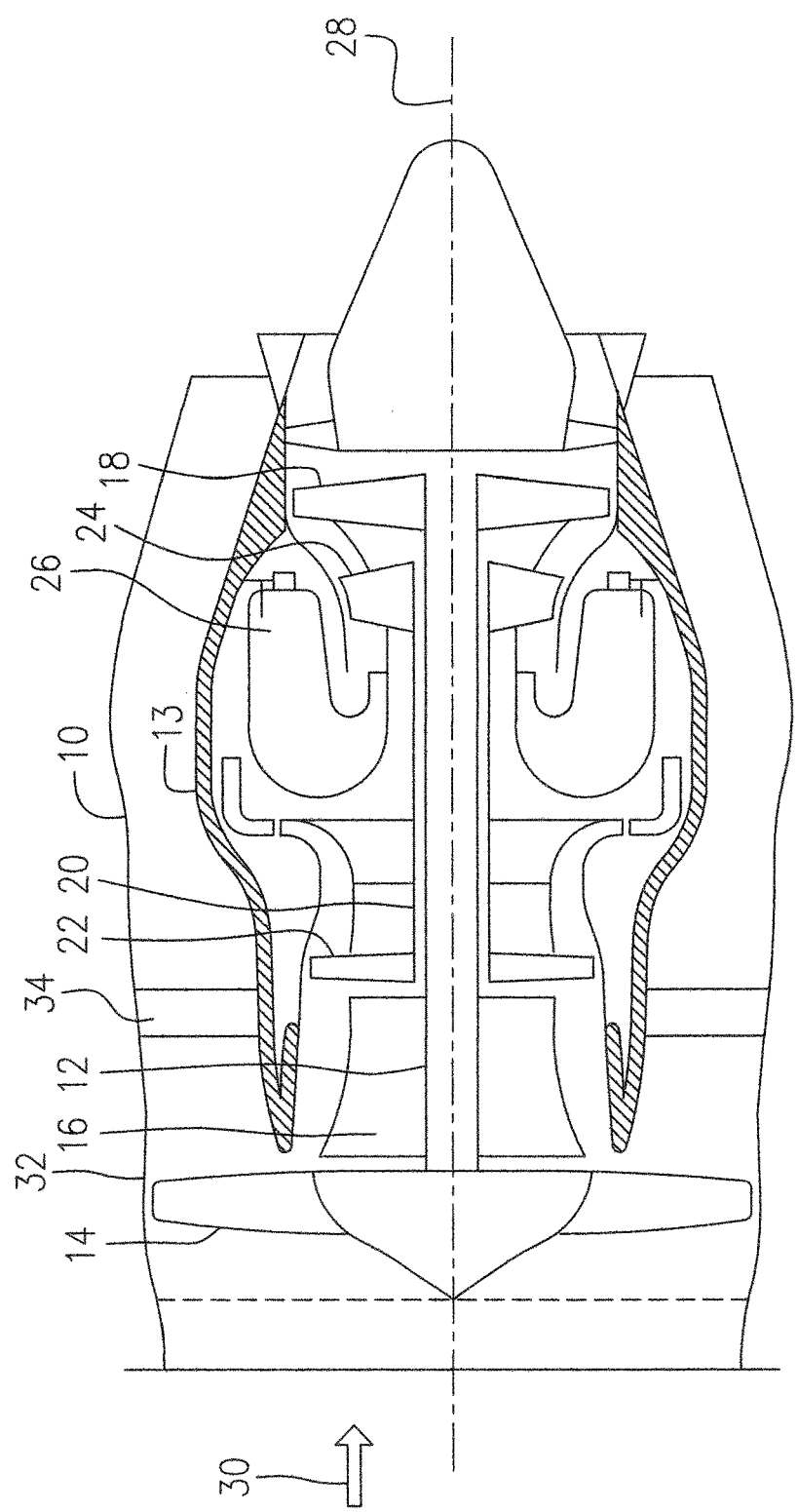
FIG. 1 is a schematic cross-sectional view of a turbofan aeroengine as an example illustrating the application of the described subject matter.

FIG. 1 illustrates a turbofan aeroengine as an example of the application of the described subject matter, which includes an outer bypass duct or nacelle 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24.

The core casing 13 surrounds the low and high pressure spool assemblies 12 and 20 in order to define a main fluid path (not numbered) therethrough including a combustor 26.

It should be noted that the terms axial, radial and circumferential are defined with respect to a main engine axis 28. The terms downstream and upstream are defined with respect to the direction of an air flow indicated by arrow 30, entering into and passing through the engine.

Figure 2:
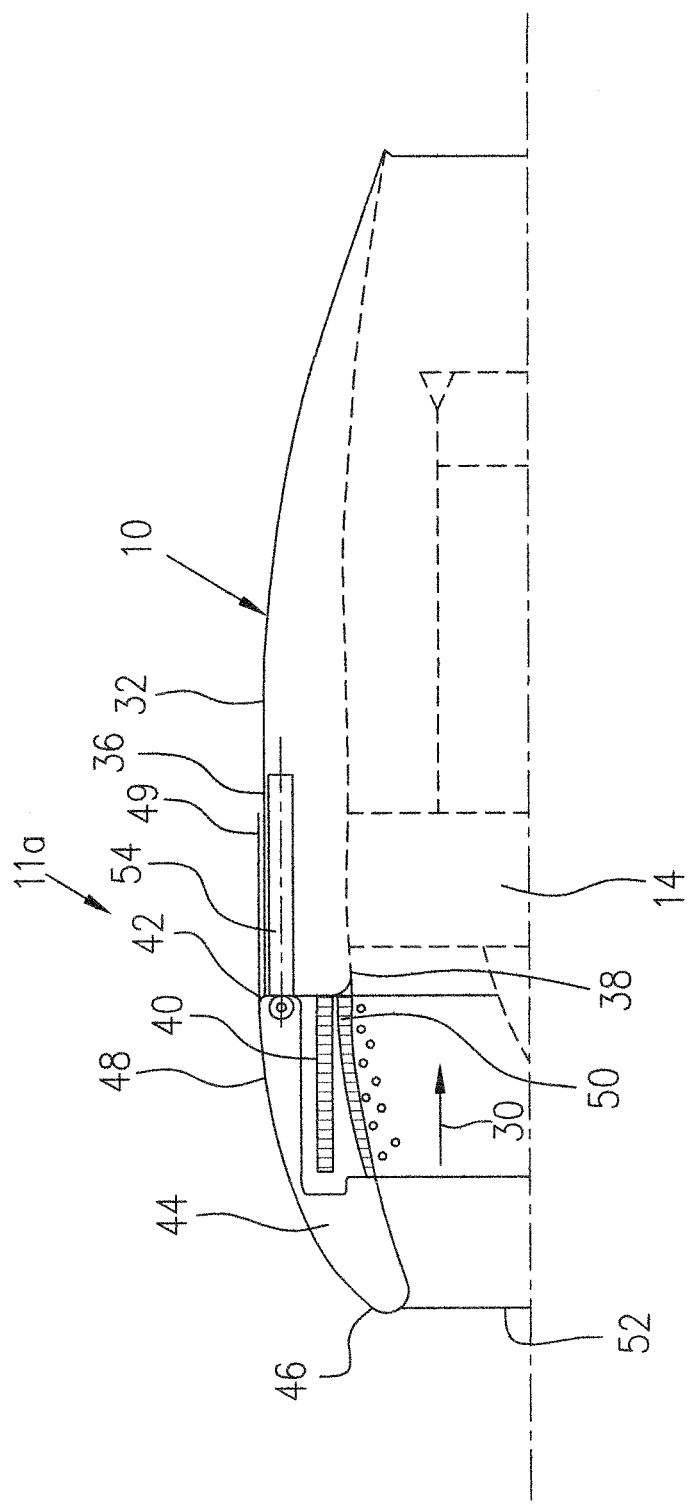
FIG. 2 is a schematic partial cross-sectional view of a turbofan aeroengine having a variable geometry inlet system in a retracted position according to one embodiment.
Figure 3:
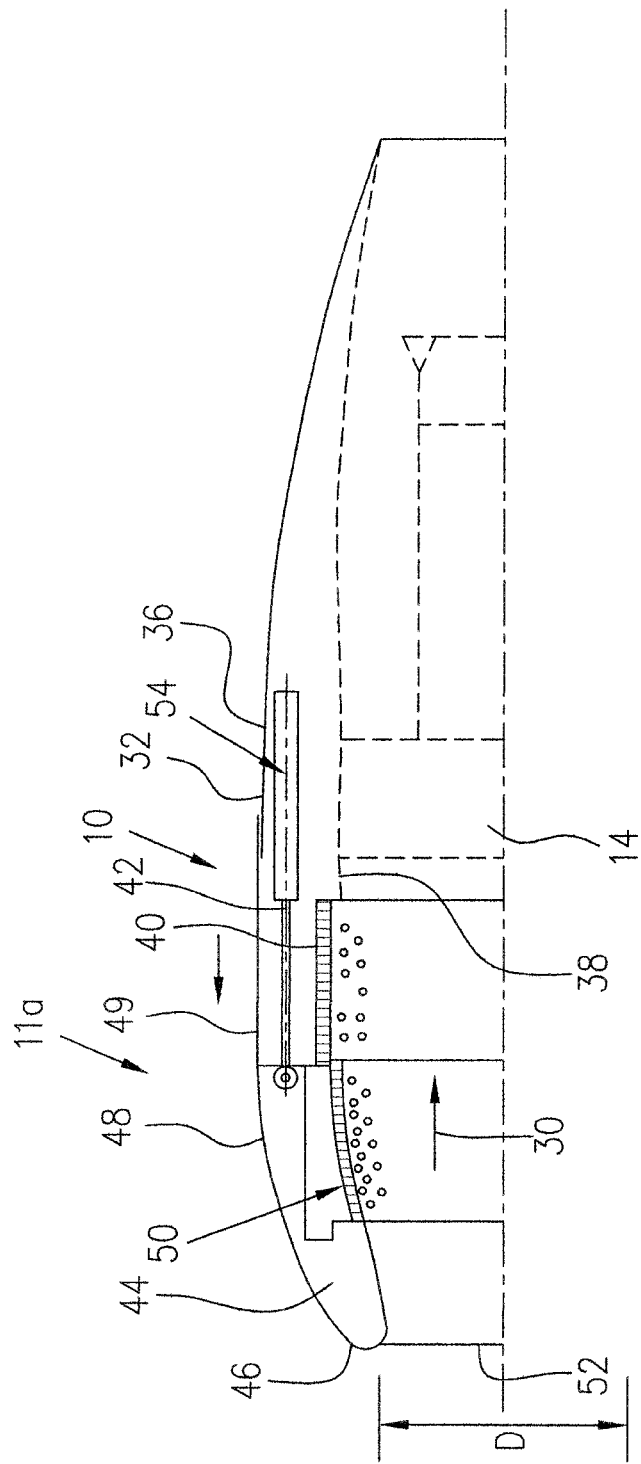
FIG. 3 is a schematic partial cross-sectional view of the turbofan aeroengine of FIG. 2, showing the variable geometry inlet system in an extended position.
Figure 7:
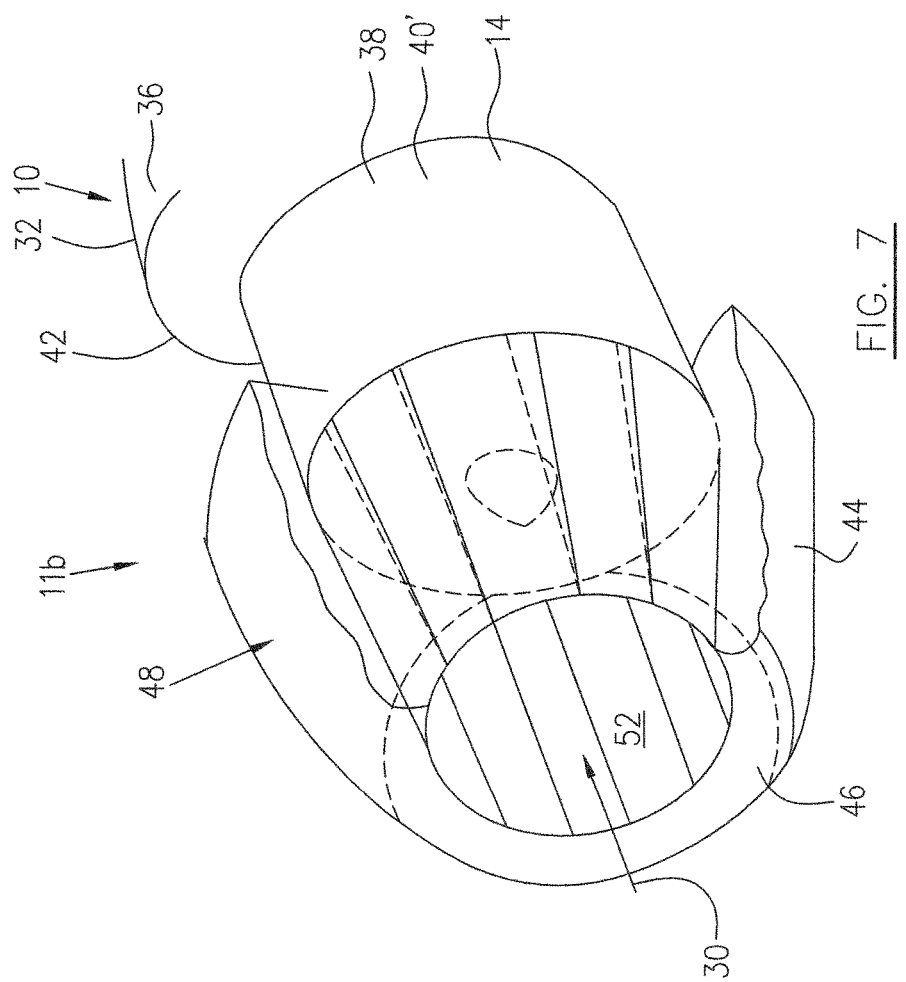
FIG. 7 is a schematic partial perspective view of the turbofan aeroengine having the variable geometry inlet system in the extended position as shown in FIG. 5, with a portion of an outer skin of the inlet cowl cut away.

Referring to FIGS. 1-3, the nacelle 10 of the aeroengine according to one embodiment, surrounds at least the fan assembly 14 and the low pressure and high pressure compressor assemblies 16, 22 and may be configured to provide a variable geometry inlet system 11a for the aeroengine. The nacelle 10 may include a main portion 32 in a stationary relationship with the engine, for example by being connected to the core casing 13 by a plurality of circumferentially spaced struts 34 (see FIG. 1). The main portion 32 of the nacelle 10 may be connected by a support structure (not shown) to an aircraft (not shown). The main portion 32 may have an annular outer skin 36 and an inner barrel 38 radially spaced apart from each other. The inner barrel 38 may include a front section 40 extending forward out of a front edge 42 of the annular outer skin 36, thereby positioning the front section 40 upstream of the front edge 42 of the annular outer skin 32.

The nacelle 10 may include an inlet cowl 44 which has an annular outer skin 48 and an annular inner wall 50 radially spaced apart from each other. The inlet cowl 44 may have a lip portion 46 at the upstream end thereof which is connected with the annular outer skin 48 and the inner wall 50. The inlet cowl 44 may be disposed upstream of the main portion 32 of the nacelle 10 and may be operatively connected to the main portion 32, for example by means of a track system (not shown) which is known in the art, such that the inlet cowl 44 is translatable between a retracted position as shown in FIG. 2 in which the outer skins 48, 36 of the respective inlet cowl 44 and the main portion 32 of the nacelle 10 are positioned immediately axially adjacent each other while the annular inner wall 50 of the inlet cowl 44 and the inner barrel 38 of the main portion 32 are inserted one into the other, and an extended position as shown in FIG. 3 in which the outer skins 48, 36 of the respective inlet cowl 44 and the main portion 32 of the nacelle 10 are positioned axially spaced apart from each other while the inner wall 50 of the inlet cowl 44 and the inner barrel 38 of the main portion 32 are inserted one into the other less than the insertion in the retracted position as shown in FIG. 2. Therefore, the annular inner wall 50 of the inlet cowl 44 and the inner barrel 38 (including its front section 40), in combination form a length-variable inlet duct.

The variable geometry inlet duct has a front opening 52 defined by the annular lip portion 46 of the inlet cowl 44 for intake of the airflow 30. The inlet duct directs the air flow 30 towards and to pass the fan rotor 14. A front section (not numbered) of the inlet duct defined by the annular inner wall 50 of the inlet cowl 44 may be movable between the extended position and the retracted position with respect to a rear section (not numbered) of the inlet duct defined by the inner barrel 38 of the main portion 32, to thereby define a variable axial length of the air inlet passage which is continuous from the front opening 52 to the fan rotor 14 without any secondary inlet opening being formed between the front and rear sections of the inlet duct, regardless of the position of the front section of the inlet duct (the position of the inlet cowl 44). It can be seen from FIGS. 2-3 that the front opening 52 of the inlet duct has a same diameter in the extended and retracted positions.

The annular inner wall 50 of the inlet cowl 44 according to one embodiment, may be affixed to the lip portion 46 and may be slidingly inserted into a front section 40 of the inner barrel 38 of the main portion 32, to form a telescoping configuration. The annular inner wall 50 of the inlet cowl 44 may define a front diameter corresponding to an inner diameter of the lip portion 46 of the inlet cowl 44 and may form a rear diameter thereof which may be greater than the front diameter of the annular inner wall 50 but slightly smaller than the inner diameter of the front section 40 of the inner barrel 38 of the main portion 32. The front section 40 of the inner barrel 38 may have a substantially consistent diameter along the length thereof to thereby be substantially cylindrical. This telescoping configuration allows the annular wall 50 to be fully inserted into the front section 40 of the inner barrel 38 of the main portion 32. In such a case, the annular front section 40 of the inner barrel 38 is fully received within an annular space between the outer skin 48 and the inner wall 50 of the inlet cowl 44 when the inlet cowl 44 is translated from the extended position to the retracted position. In this telescoping configuration the annular inner wall 50 of the inlet cowl 44 and the front section 40 of the inner barrel 38 may each be made of a respective metal ring of a single piece component.

In the retracted position, the outer skin 48 of the inlet cowl 44 may be positioned immediately axially adjacent the front edge 42 of the annular outer skin 36 of main portion 32, without a substantial axial gap therebetween, to thereby provide a low drag profile of the nacelle 10 for flight conditions such as cruise flight and take-off. In aircraft approach operations drag is less important for fuel consumption and therefore, the inlet cowl 44 can be translated to its extended position to increase the length/diameter ratio of the inlet duct formed within the nacelle 10, which may help with reduction of noise levels propagated through the inlet duct.

In order to further increase noise attenuation, the inner wall 50 of the inlet cowl 44 and the front section 40 of the inner barrel 38 of the main portion 32 may be provided with acoustic treatment capabilities, for example, by providing perforations therethrough or noise absorption material thereon to define a variable-geometry acoustic treatment area on the inner surface of the length-variable inlet duct formed within the nacelle 10. When the inlet cowl 44 is in the extended position the acoustic treatment area defined by the inner surface of the front section 40 of the inner barrel 38, is exposed and thus the total acoustic treatment area (provided by the inner surface of both the inner wall 50 and the front section 40 of the inner barrel 38) is increased, in contrast to the total acoustic treatment area substantially defined by only the inner surface of the inner wall 50 of the inlet cowl 44 when the inlet cowl 44 is in the retracted position.

Optionally, one or more actuators 54 may be provided, for example being positioned in a space between the outer skin 36 and the inner barrel 38 of the main portion 32 and being supported on a stationary structure (not numbered) of the engine and may be operatively connected to the inlet cowl 44 for moving the inlet cowl 44 between the extended and retracted positions.

Referring to FIGS. 1 and 4-7, the nacelle 10 of the aeroengine may be configured to provide a variable geometry inlet system 11 b according to another embodiment. The description of the variable geometry inlet system 11 b below will be focussed on the structures and features which are different from those of the variable geometry inlet system 11 a described above and illustrated in FIGS. 2-3, and like structures and features will be indicated by like reference numerals and will not be redundantly described below.

The fan assembly 14 may include a fan casing (not numbered) surrounding a fan rotor (not numbered). The fan casing according to this embodiment may be part of the inner barrel 38 of the main portion 32 of the nacelle 10 and may form a front section 40' of the inner barrel 38, positioned upstream of the front edge 42 of the annular outer skin 36 of the main portion 32. The fan casing, at least a section thereof, thereby forms the stationary rear section of the inlet duct defined by the nacelle 10.

A plurality of circumferentially distributed plates 56 each may be pivotally connected about a tangential axis 58 (shown as a pivoting point in FIGS. 4 and 5) at a front edge thereof, to an inside of the lip potion 46 of the inlet cowl 44, to define an annular inner wall 50'. The circumferentially distributed plates 56 may overlap or interweave in the circumferential direction at adjacent side edges thereof. The interweaving or overlap of the plates 56 may be configured such that the annular inner wall 50' defined by the plates 56 may be substantially free of gaps or ridges between adjacent plates 56. An actuation system 60 may be provided to the plates 56 to actuate a pivotal motion about their respective tangential axis 58 such that the annular inner wall 50' defined by the plates 56 is configured as a petal configuration having a truncated conical profile. The truncated conical profile may have a fixed diameter defined by the front edges of the plates 56 which corresponds to the inner diameter of the lip portion 46 of the inlet cowl 44, and may have a variable conical angle resulting in a variable diameter at the rear edges (not numbered) of the plates opposite to the respective front edges of the respective plates. As the inlet cowl 44 is axially translated for example by the actuator 54 (only shown in FIGS. 2 and 3), between the retracted and extended positions, the petal configuration of the annular inner wall 50' may allow the conical angle thereof to be adjusted such that the annular front edge of the front section 40' (the front edge of the fan casing in this embodiment) of the inner barrel 38 of the main portion 32, is in contact with the respective plates 56, thereby preventing formation of an abrupt step normal to the airflow 30, between the plates 56 and the annular front section 40' of the inner barrel 38 of the main portion 32. This petal configuration also provides such a length-variable inlet duct by changing the conical angle thereof to allow a variable axial portion of the front section 40' of the inner barrel 38 of the main portion 32, to be inserted into the truncated conical profile of the plates 56.

When the inlet cowl 44 is in the retracted position and the front section 40' of the inner barrel 38 is inserted deepest into the conical profile of the plates 56, an axial portion of the plates 56 may be received in the annular space defined between the front section 40' of the inner barrel 38 (the van casing in this embodiment) and the outer skin 48 of the inlet cowl 44, as shown in FIG. 4.

The plates 56 may be supported by a track system (which may be similar to those used for aircraft flaps) to ensure that the plates maintain their correct radial position throughout the translation of the plates 56 when the inlet cowl 44 moves between the retracted and extended positions. The actuation system 60 may include a series of individual actuators or a reduced number of actuators connected by a unison linkage system (not shown). The actuation system 60 may be made with electric, hydraulic or pneumatic means including an air motor or jack system which may be supplied by a branch from an inlet lip anti-icing system (not shown).

The plates 56 may be provided with perforations therethrough or may have noise absorbing material applied on the inner surface thereof to thereby provide a variable-geometry acoustic treatment area which may increase when the inlet cowl 44 moves to the extended position to expose more inner surface of the plates 50' (which form a portion of the axial length of the front section of the inlet duct) to the noise propagation through the inlet duct.

It should be noted that the above embodiments of the described subject matter may be used to increase the inlet length/diameter ratio and thus the acoustic treatment area under aircraft landing approach conditions in order to achieve reduction of community noise. Nevertheless, the above-described subject matter may also be applicable to make a low drag inlet system for high bypass engines. In order to minimize drag with clean inlet conditions at high speed flight operation, the inlet and forward cowl should be short. However, during low speed flight operation, for example in landing approach, conditions such as cross winds and ground vortices can result in fan inlet flow distortion in the inlet. The variable-geometry inlet may be able to provide a high length/diameter ratio for those conditions and a short inlet with low forward cowl drag in high speed flight operation.

A secondary outer skin 49 as shown in FIGS. 2 and 3 may be optionally provided. The secondary skin 49 is a downstream extension of the annular outer skin 48 of the inlet cowl 44, being stored within the nacelle 10 under the outer skin 36 of the main portion 32 when in the retracted position, and extending to cover a gap between the annular outer skin 48 and the and or outer skin 36 when in the extended position, in order to reduce external noise resulting from turbulence due to the discontinuity in the outer nacelle skin. The optional secondary outer skin 49 may be employed in situations where drag or turbulence need to be minimized for either noise or performance concerns.

The above description is meant to be exemplary only, and one skilled in the art will recognize that changes may be made to the embodiments described without departing from the disclosed subject matter. For example, a turbofan aeroengine is described as an application of the described embodiments, however aeroengines of other types, such as pusher turboprop aeroengines or other may also be suitable for application of the described subject matter. Any suitable number of inlet sections may be provided. Any suitable relative motion, or combination of motions, may be used to apply the teachings hereof. Still other modifications which fall within the scope of the described subject matter will be apparent to those skilled in the art, in light of a review of this disclosure, and such modifications are intended to fall within the appended claims.

The invention claimed is:

1. A variable geometry inlet system of an aeroengine comprising an inlet duct having an annular lip portion and a front opening defined by the annular lip portion for intake of an air flow, the inlet duct configured for directing the air flow from the front opening to a compressor, the inlet duct including at least first and second sections, the first and the second sections movable relative to one another between an extended position and a retracted position, the first and second sections in the extended position defining an axially longer inlet duct than when in the retracted position, the inlet duct extending continuously from the front opening of the inlet duct to the compressor in both positions and providing only one inlet path for the air flow from the front opening to the compressor regardless of the inlet duct position, the front opening of the inlet duct having a same diameter in the extended position and in the retracted position.

2. The system of claim 1, wherein the first section is affixed to a stationary structure of the aeroengine and the second section is moveable relative to the first section.

3. The system of claim 1, wherein the first section is positioned generally downstream of the second section relative to the air flow through the inlet duct.

4. The system of claim 1, wherein the first and second sections telescopically cooperate with one another.

5. The system as defined in claim 1, wherein at least one of the first and second sections includes an acoustic treatment area defined on an inner surface.

6. The system as defined in claim 1 wherein the aeroengine is a turbofan and the compressor is a fan rotor, the system further comprising a nacelle surrounding the fan rotor, the nacelle including a main portion having an annular outer skin and an inner barrel in a stationary position on the aeroengine, the inner barrel defining the first section of the inlet duct, the nacelle further including an inlet cowl having a lip portion with an annular outer skin and an annular inner wall, the annular inner wall defining the second section of the inlet duct, the inlet cowl being movable between the retracted position in which the outer skins of the respective inlet cowl and main portion are positioned adjacent each other in an inserted condition to provide a low drag profile, and the extended position in which the outer skins of the respective inlet cowl and the main portion are axially spaced apart from each other, causing the first and second sections of the inlet duct to be less inserted one into the other with respect to the inserted condition when the inlet cowl is in the retracted position.

7. The system as defined in claim 6 comprising an actuator supported on a stationary structure of the aeroengine and operatively connected to the inlet cowl for moving the inlet cowl between the extended and retracted positions.

8. The system as defined in claim 6 wherein the annular inner wall of the inlet cowl defines a front diameter smaller than a rear diameter thereof.

9. The system as defined in claim 6 wherein the annular inner wall of the inlet cowl is affixed to the lip portion and is slidingly inserted into the inner barrel of the main portion to form a telescoping configuration.

10. The system as defined in claim 9 wherein the annular inner wall of the inlet cowl and the inner barrel of the main portion each comprise an annular acoustic treatment area defined on an inner surface of the respective annular inner wall and inner barrel.

11. The system as defined in claim 6 wherein the inner barrel comprises a fan case positioned around the fan rotor.

12. A variable geometry inlet system of an aeroengine comprising an inlet duct having an annular lip portion and a front opening defined by the annular lip portion for intake of an air flow, the inlet duct configured for directing the air flow from the front opening to a compressor, the inlet duct including at least first and second sections, the first and the second sections movable relative to one another between an extended position and a retracted position, the first and second sections in the extended position defining an axially longer inlet duct than when in the retracted position, the inlet duct extending continuously from the front opening to the compressor in both positions and providing only one inlet path for the air flow from the front opening to the compressor regardless of the inlet duct position, the front opening of the inlet duct having a same diameter in the extended position and in the retracted position, wherein the first and second sections include an acoustic treatment area defined on an inner surface to form a variable-geometry acoustic treatment area, and wherein in the extended position the acoustic treatment area defined by the inner surface of the first section is exposed and a total acoustic treatment area is increased with respect to that in the retracted position.

13. The system of claim 12, wherein the first section is affixed to a stationary structure of the aeroengine and the second section is moveable relative to the first section.

14. The system of claim 12, wherein the first section is positioned generally downstream of the second section relative to the air flow through the inlet duct.

15. The system of claim 12, wherein the first and second sections telescopically cooperate with one another.

16. The system as defined in claim 12 wherein the aeroengine is a turbofan and the compressor is a fan rotor, the system further comprising a nacelle surrounding the fan rotor, the nacelle including a main portion having an annular outer skin and an inner barrel in a stationary position on the aeroengine, the inner barrel defining the first section of the inlet duct, the nacelle further including an inlet cowl having a lip portion with an annular outer skin and an annular inner wall, the annular inner wall defining the second section of the inlet duct, the inlet cowl being movable between the retracted position in which the outer skins of the respective inlet cowl and main portion are positioned adjacent each other in an inserted condition to provide a low drag profile, and the extended position in which the outer skins of the respective inlet cowl and the main portion are axially spaced apart from each other, causing the first and second sections of the inlet duct to be less inserted one into the other with respect to the inserted condition when the inlet cowl is in the retracted position.

17. The system as defined in claim 16 comprising an actuator supported on a stationary structure of the aeroengine and operatively connected to the inlet cowl for moving the inlet cowl between the extended and retracted positions.

18. The system as defined in claim 16 wherein the annular inner wall of the inlet cowl defines a front diameter smaller than a rear diameter thereof.

19. The system as defined in claim 16 wherein the annular inner wall of the inlet cowl is affixed to the lip portion and is slidingly inserted into the inner barrel of the main portion to form a telescoping configuration.

20. The system as defined in claim 16 wherein the inner barrel comprises a fan case positioned around the fan rotor.

\* \* \* \* \*